A. W. Case,
Journal Bearing.
N° 78,428.      Patented June 2, 1868.

Witnesses:
W. C. Ashkettle
Wm. A. Morgan

Inventor:
A. W. Case
per Munn & Co.
Attorney

United States Patent Office.

A. W. CASE, OF SOUTH MANCHESTER, CONNECTICUT.

Letters Patent No. 78,428, dated June 2, 1868.

IMPROVED THRUST-BEARING.

The Schedule referred to in these Letters Patent and making part of the same.

TO ALL WHOM IT MAY CONCERN:

Be it known that I, A. W. CASE, of South Manchester, in the county of Hartford, and State of Connecticut, have invented a new and useful Improvement in Thrust-Bearings; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
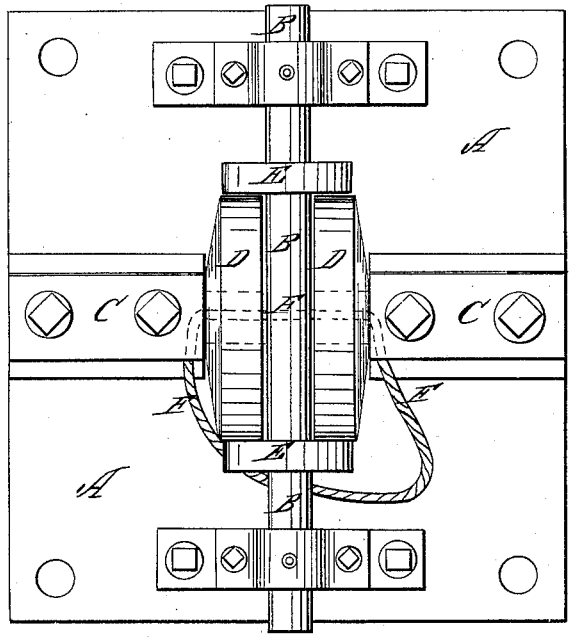
Figure 1 is a top view of my improved thrust-bearing, as applied to a horizontal shaft.
Figure 2:
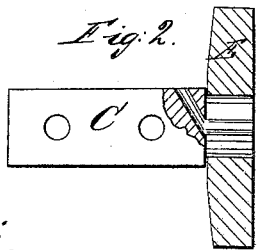
Figure 2 is a detail under side view, partly in section, of one of the friction-wheel journals, showing the oiling-arrangement.

My invention has for its object to furnish an improved thrust-bearing for vertical and horizontal shafts, such as water-wheel shafts, propeller-shafts, &c., which shall be simple in construction, and at the same time reliable and effective in operation, diminishing friction and resisting the thrust of the shaft.

It consists in the combination of one or more wheels, formed upon or attached to the shaft, and two friction-wheels placed upon each side of the shaft, and parallel with it, and in the construction and arrangement of the oiling-device; the whole being constructed and arranged as hereinafter more fully described.

A is the bed-plate of the bearing, which is securely attached to some suitable and firm foundation or support.

B is the shaft, the thrust of which is to be resisted, and which revolves in bearings attached to the bed-plate A, or to some other suitable support, according to the position and character of the said shaft.

C are two blocks, bolted securely to the bed-plate A, upon opposite sides of the shaft B, and at right angles to it.

Upon the inner ends of the blocks C are formed journals, upon which are placed two friction-wheels, D, so that the said friction-wheels D may be upon opposite sides of shaft B, and parallel therewith.

E is a wheel, formed upon or securely attached to the shaft B, in such a position that it may rest against the faces of the two friction-wheels, D, so that the said friction-wheels may sustain the thrust of the said shaft.

In the case of propeller-shafts and others, where a reverse motion of the shaft reverses the direction of the thrust, another wheel, E, should be formed upon the shaft B, upon the other side of the friction-wheels D, to resist the thrust in that direction; but where the thrust is always in the same direction, this second wheel will not be required.

F is a piece of candle-wick, or other fibrous material, which passes in through a hole in one of the blocks, C, along a groove in the under side of the journal, upon which the friction-wheel D revolves, thence across the shaft B along a groove in the under side of the journal of the other friction-wheel, and out through a hole in the lower part of the other block, C.

The outer ends of the wick or fibrous material, F, are placed in an oil-cup, so that it may conduct the oil to the friction-wheels D, in such quantities as to keep the said wheels thoroughly oiled in all their parts.

Having thus described my invention, I claim as new, and desire to secure by Letters Patent—

1. An improved thrust-bearing, formed by the combination of the wheels E, one or both, and friction-wheels D, with each other, and with the shaft B, substantially as herein shown and described, and for the purpose set forth.

2. The oiling-device, formed by passing a piece of candle-wick, or other suitable fibrous conductor, through holes in the blocks C, and along grooves in the under side of the journals of the friction-wheels D, substantially as herein shown and described, and for the purpose set forth.

A. W. CASE.

Witnesses:
WILLARD CASE,
FRANK CASE.